(12) United States Patent  
Keong

(10) Patent No.: US 7,026,604 B2  
(45) Date of Patent: Apr. 11, 2006

(54) VERNIER-SCALED HIGH-RESOLUTION ENCODER

(76) Inventor: Chong Chee Keong, Seberang Jaya, 13700 Perai (MY)

( * ) Notice: Subject to any disclaimer, the term of this patent is extended or adjusted under 35 U.S.C. 154(b) by 284 days.

(21) Appl. No.: 10/616,633

(22) Filed: Jul. 9, 2003

(65) Prior Publication Data

US 2005/0006571 A1    Jan. 13, 2005

(51) Int. Cl.  
*G01D 5/34* (2006.01)

(52) U.S. Cl. .................................. 250/231.13

(58) Field of Classification Search ..............  
250/231.13–231.19, 237 G; 341/13

See application file for complete search history.

(56) References Cited

U.S. PATENT DOCUMENTS 4,529,964 A * 7/1985 Minami et al. ............... 341/13

* cited by examiner

*Primary Examiner*—Thanh X. Luu

(57) ABSTRACT

An encoder having a first array of n photodetectors and a code strip imaging system where n>2 is disclosed. Each photodetector is characterized by a width d. The code strip imaging system generates an image of a code strip on the first array. The image includes alternating dark and light stripes of width D. The dark stripes have a lower luminosity than the white stripes. The widths of the photodetectors and stripes in the image are chosen such that nd=(n−1)D, the code strip image moving in a first direction with respect to the first array, wherein the distances d and D are measured in a direction parallel to the first direction. Detector circuits convert the outputs from the photodetectors to logic signals that define a state for the encoder that repetitively cycles through 2n values when the code strip image moves a distance of 2D.

5 Claims, 5 Drawing Sheets

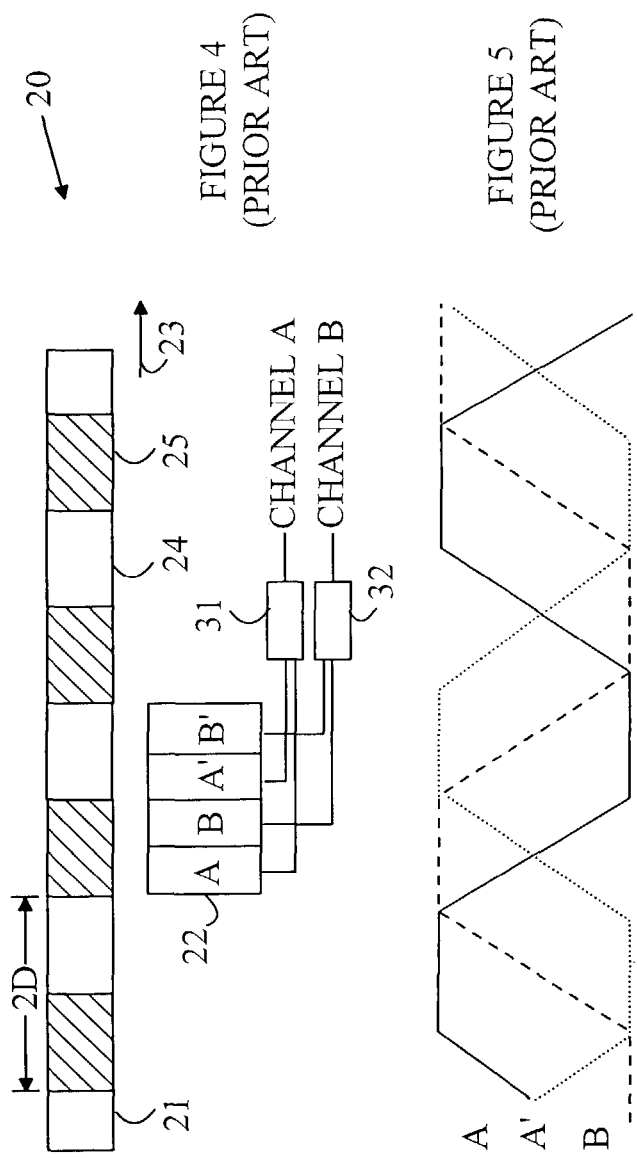

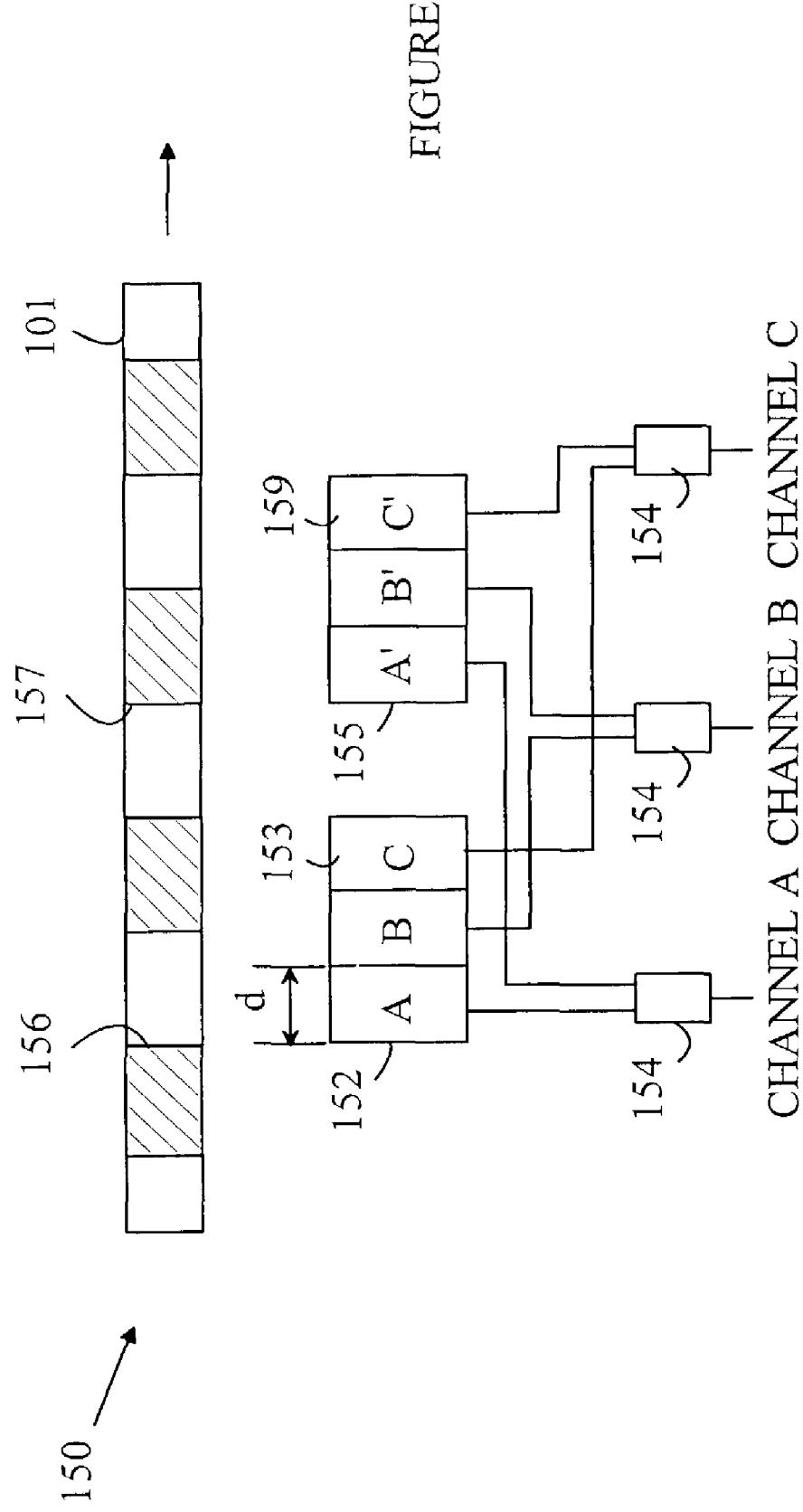

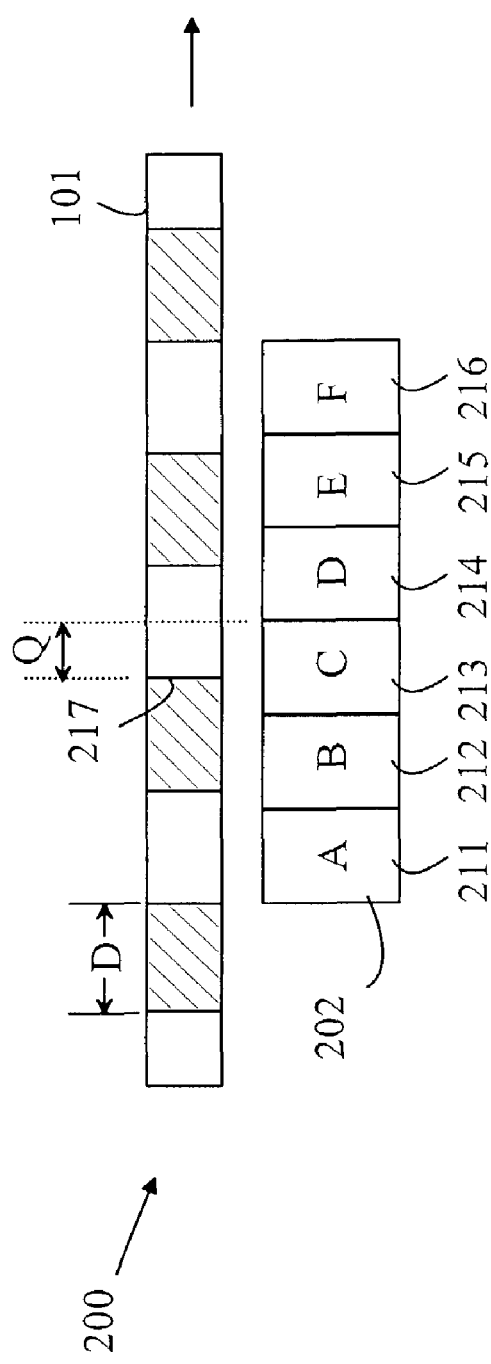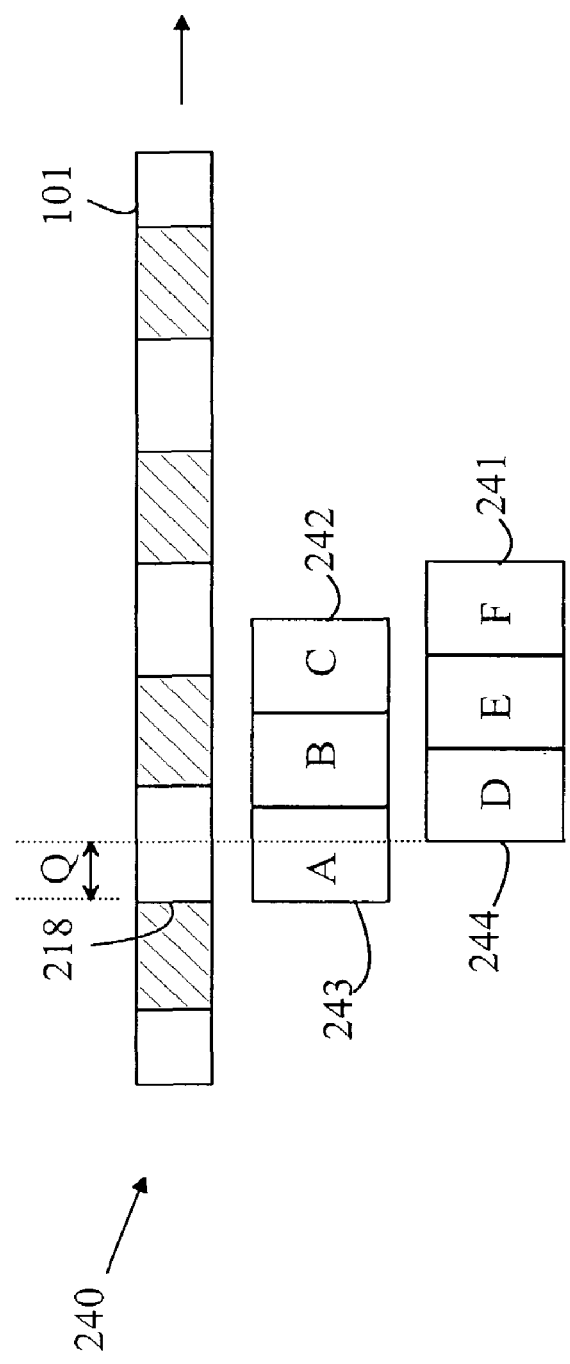

VERNIER-SCALED HIGH-RESOLUTION ENCODER

FIELD OF THE INVENTION

The present invention relates to encoders.

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

An absolute shaft encoder typically utilizes a plurality of tracks on a disk that is connected to the shaft. Each track consists of a series of dark and light stripes that are viewed by a detector that outputs a value of digital 1 or 0, depending on whether the area viewed by the detector is light or dark. An N-bit binary encoder typically utilizes N such tracks, one per bit. An incremental encoder typically utilizes a single track that is viewed by a detector that determines the direction and the number of stripes that pass by the detector. The position is determined by incrementing and decrementing a counter as each stripe passes the detector.

In both types of encoder, the ultimate resolution is determined by the stripe pattern and size of the detectors used to view the stripe pattern. To provide increased resolution, the density of the stripes must be increased. For example, in a shaft encoder, the number of stripes per degree of rotation must be increased. Similarly, in a linear encoder, the number of stripes between the limits of the linear motion must be increased. There is a practical limit, however, to the density of stripes that is set by optical and cost constraints.

In principle, some form of analog detection array based on analog interpolation can be used to define additional states. However, such systems have higher costs due to the additional analog circuitry. In addition, the analog encoding schemes are more susceptible to noise.

SUMMARY OF THE INVENTION

The present invention includes an encoder having a first array of n photodetectors and a code strip imaging system where n>2. Each photodetector is characterized by a width d. The code strip imaging system generates an image of a code strip on the first array. The image includes alternating dark and light stripes of width D. The dark stripes have a lower luminosity than the white stripes. The widths of the photodetectors and stripes in the image are chosen such that $nd=(n-1)D$, the code strip image moving in a first direction with respect to the first array, wherein the distances d and D are measured in a direction parallel to the first direction. In one embodiment, a plurality of detector circuits converts the output from the photodetectors to logic signals. Each detector circuit converts a light intensity signal from a corresponding one of the photodetectors to a channel signal that switches between the first and second logic states when the code strip moves relative to the array. In another embodiment, the encoder further includes a complementary array of n photodetectors. Each photodetector in the complementary array is characterized by a width, d. Each photodetector in the complementary array is positioned relative to a corresponding photodetector in the first array such that that photodetector generates a light intensity signal that is the complement of the light intensity signal generated by the corresponding one of the photodetectors in the first array. In another embodiment, the first array of photodetectors is divided into a second array of photodetectors and a third array of photodetectors, each photodetector in the second array and the third array having a width d. The third array of photodetectors is offset from the first array of photodetectors in the first direction. The third array is also preferably offset from the second array of photodetectors in a direction orthogonal to the first direction. The channel signals define a state for the encoder that repetitively cycles through 2n values when the code strip image moves a distance of 2D relative to the first array in the first direction.

BRIEF DESCRIPTION OF THE DRAWINGS

FIG. 4 illustrates a prior art two-channel encoder 20.
FIG. 5 is a graph of the amplitude of the output of each photodetector as a function of position of the code strip image.
FIG. 6 illustrates the channel A and channel B signals when the code strip is moving in the direction shown by arrow 23 in FIG. 4.
FIG. 9 illustrates a 3-photodiode embodiment of the present invention in which a second set of 3 photodiodes are utilized to provide a set of complementary signals.
FIG. 10 illustrates an embodiment of the present invention having 6 photodiodes 211–216.
FIG. 11 illustrates a 6 photodiode encoder 240 constructed from two sub-arrays of photodiodes.

DETAILED DESCRIPTION OF THE PREFERRED EMBODIMENTS OF THE INVENTION

Figure 1:
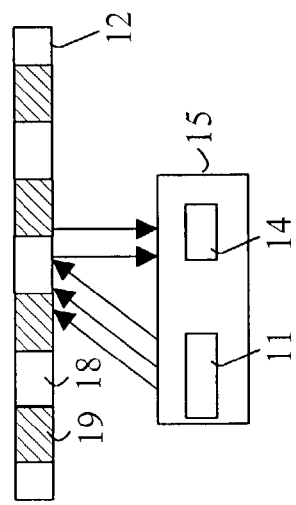
FIG. 1 illustrates a transmissive encoder.
Figure 2:
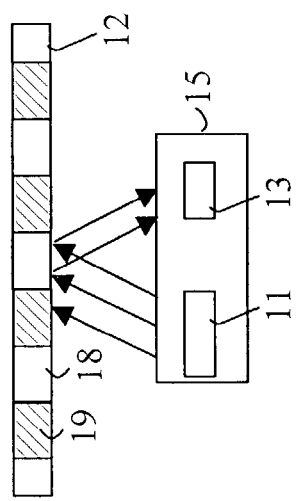
FIG. 2 illustrates a reflective encoder.
Figure 3:
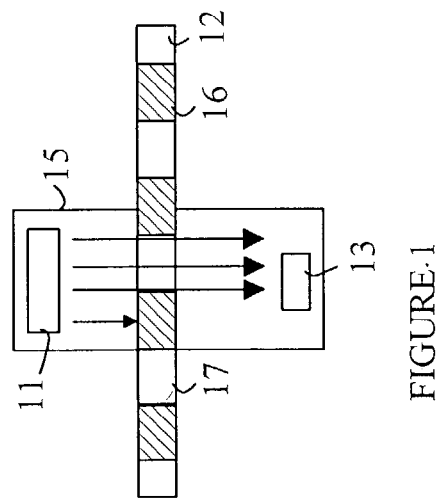
FIG. 3 illustrates an imaging encoder.

Refer now to FIGS. 1–3, which illustrate some typical encoder designs. The encoder can be divided into an emitter/detector module 15 and a code wheel or code strip. Module 15 includes an emitter 11 that illuminates a portion of the code strip 12. The illuminated code strip is viewed by a detector 13. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as a lens that is part of the emitter. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

FIG. 2 illustrates a reflective encoder. In reflective encoders, the code strip includes reflective stripes 18 and absorptive stripes 19. Again, the emitter includes a collimating optic such as a lens. The light from the emitter is reflected or absorbed by the stripes on the code strip. The reflected light is imaged onto the photodiodes in the detector. The output from the photodetectors is again converted to a logic signal.

FIG. 3 illustrates an imaging encoder. An imaging encoder operates essentially the same as the reflective encoder described above, except that module 15 includes imaging optics that form an image of the illuminated code strip on the detector 14.

In each of these types of encoders, an image of one portion of the stripe pattern is generated on the photosensitive area of a photodiode in an array of photodiodes. To simplify the following discussion, drawings depicting the image of the code strip and the surface area of the photodetectors on which the image is formed will be utilized. In each drawing, the image of the code strip will be shown next to the photodiode array to simplify the drawing. However, it is to be understood that in practice, the image of the code strip would be projected onto the surface of the photodiode array. In addition, to further simplify the drawings, the light source and any collimating or imaging optics are omitted from the drawings.

Refer now to FIG. 4, which illustrates a prior art two-channel encoder 20. Encoder 20 includes a code strip that is imaged to form an image 21 that is viewed by a detector array 22. The image 21 of the code strip consists of alternating "white" and "black" stripes shown at 24 and 25, respectively. For the purposes of this example, it will be assumed that when a white stripe is imaged on a detector, the detector outputs its maximum signal value, and when a black stripe is imaged on the detector, the detector outputs its minimum value. It will also be assumed that the detector outputs an intermediate value when only a portion of a white stripe is imaged onto the detector.

Detector array 22 is constructed from 4 photodetectors labeled A, A', B, and B'. Each photodetector views a portion of image 21 that has an area that is one half the area of one stripe in the image. The A' and B' detectors are positioned such that the A' and B' detectors generate the complement of the signal generated by the A and B detectors, respectively. The outputs of the A, A', and B photodetectors are shown in FIG. 5, which is a graph of the amplitude of the output of each photodetector as a function of position of the code strip image. To simplify FIG. 5, the output of the B' photodetector has been omitted.

The signals generated by these detectors are combined by detector circuits 31 and 32 to generate two logic channel signals that are 90 degrees out of phase as shown in FIG. 6. FIG. 6 illustrates the channel A and channel B signals when the code strip is moving in the direction shown by arrow 23 in FIG. 4. If the code strip were to move in the opposite direction, the channel B signal would lead the Channel A signal; however, the two signals would still be 90 degrees out of phase.

Circuits for converting the photodiode output signals to the channel signals shown in FIG. 6 are known in the art, and hence, will not be discussed in detail here. For the purposes of this discussion, it is sufficient to note that the channel signal corresponding to a pair of photodiode output signals such as A and A' switches between logical one and logical zero at the points at which the output of detector A is equal to the output of detector A'.

The two channel signals provide a measurement of the direction of motion of the image of the code strip relative to the detector array. In addition, the two channel signals define 4 states that divide the distance measured by one black and one white stripe into quarters. The 4 states correspond to a two-bit binary number in which the first bit is determined by the value of the channel A signal and the second bit is determined by the value of the channel B signal. Hence, this type of system has an accuracy equal to half of the width of one of the stripes.

Consider the case in which the code strip is attached to a device that moves linearly along a track of length L. The accuracy with which the position of the device can be measured using this type of decoder is D/2L. Hence, to improve the accuracy, D must be reduced. Since the detector size is also determined by D, the detector size must also be reduced. As noted above, there is a practical limit to the size of the code strip and the corresponding detectors in the detector array. Once this limit is reached, the cost associated with further improvements in resolution utilizing this method become prohibitive.

In principle, a device having a larger number of channels can be constructed by utilizing more photodiode pairs per pair of stripes. This relieves the constraints on reducing the size of the code strip. However, such an arrangement still requires that the dimensions of the photodiodes be reduced. The present invention provides an encoder having an increased number of states per pair of stripes without requiring that the photodiode dimensions be reduced relative to the stripe spacing in the image.

Figure 7:
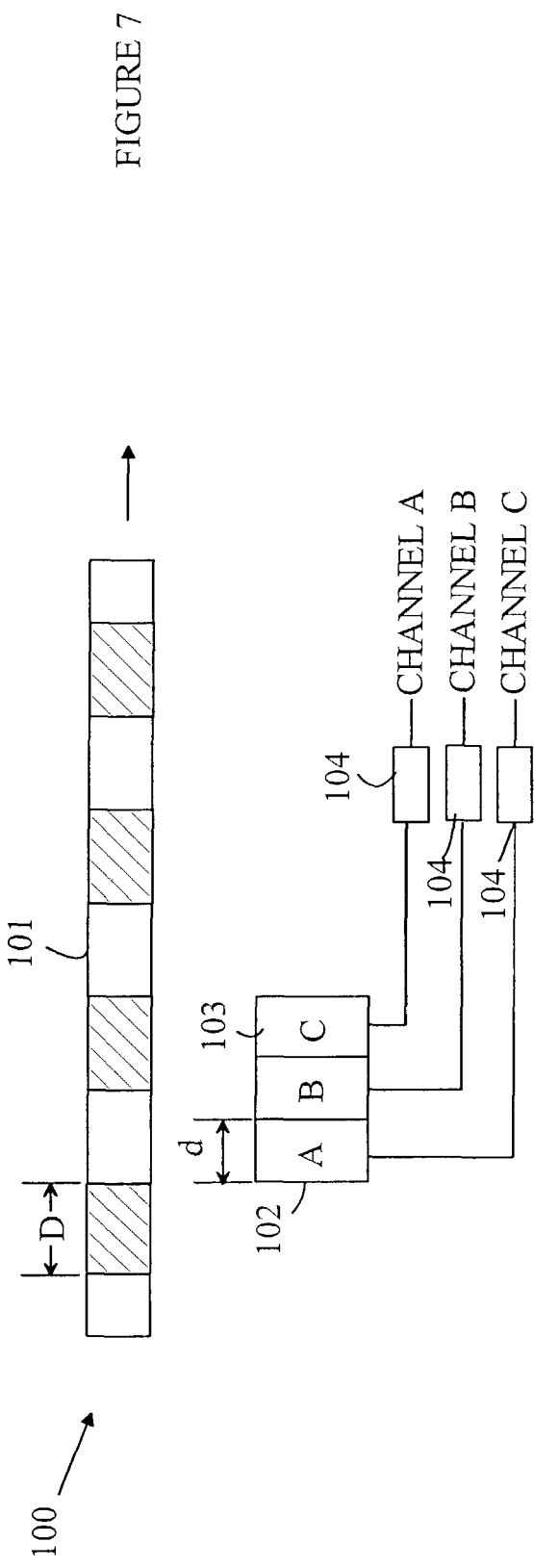
FIG. 7 illustrates the relationship between a photodiode array and the corresponding code strip image in an encoder 100 according to one embodiment of the present invention.

Refer now to FIG. 7, which illustrates the relationship between a photodiode array and the corresponding code strip image in an encoder 100 according to one embodiment of the present invention. Denote the width of each stripe in the code strip image 101 by D. The code strip image is projected on a photodiode array 102 having n photodiodes 103 of width d. In the present invention, the width of the photodiodes is chosen such that $nd=(n-1)D$. Here, $n>2$. In the example shown in FIG. 7, $n=3$.

Figure 8:
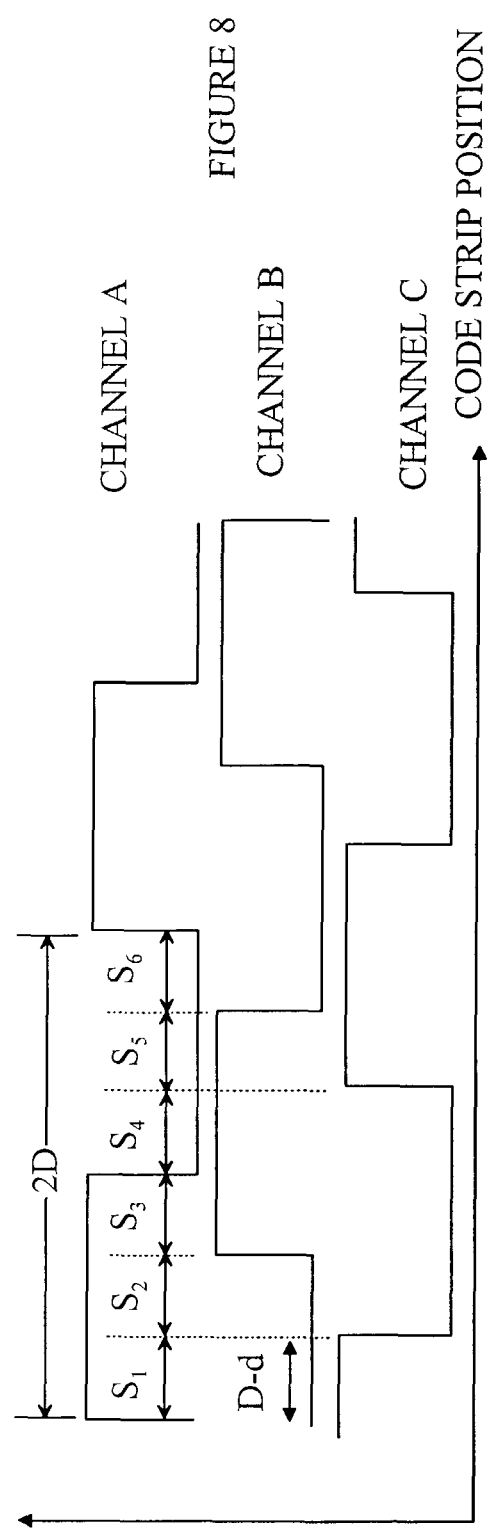
FIG. 8 illustrates the relationship between the output of circuits 104 and the various states.

Each of the photodiodes is connected to a corresponding circuit 104 that generates a logic signal that switches between logical one and logical zero when the output of the photodiode crosses some predetermined threshold value. It can be shown that the n-bit integer having the binary digits given by the n outputs of circuits 104 will cyclically pass through 2n states shown at $S_1$–$S_6$ when the code strip image moves through a distance 2D over the photodiode array as shown in FIG. 8, which illustrates the relationship between the outputs of circuits 104 and the various states.

In general, each state corresponds to a distance on the code strip image of D-d. Since $nd=(n-1)D$, each stripe in the code strip image is divided into D/n segments. That is, the state of the counter will change each time the code strip image moves through a distance D/n. In addition, the width of the photodetectors increases with n. Hence, the limitations of the prior art systems discussed above are overcome.

The embodiments of the present invention discussed above did not utilize a set of complementary photodiodes to generate the channel signals. However, embodiments of the present invention in which a complementary set of photodiodes are utilized in a manner analogous to that discussed above with reference to FIGS. 4 and 5 can also be practiced. Refer now to FIG. 9, which illustrates a 3-photodiode embodiment of the present invention in which a second set of 3 photodiodes 153 are utilized to provide a set of complementary signals. Encoder 150 includes a code strip and an illumination system that generates an image 101 of the code strip onto two 3-photodiode arrays 152 and 155. Once again, the optical system that generates the image and the code strip have been omitted from the drawing to simplify the drawing. The photodiodes of photodiode array 152 are offset from the photodiodes 159 of photodiode array 155 such that the signal from photodiode A is the complement of that from photodiode A', the signal from photodiode B is the complement of that from photodiode B', and so on. This alignment can be accomplished by offsetting array 155 such that photodiode A' is aligned with a boundary 157 between a white and black stripe when photodiode A is aligned with a boundary 156 between a black stripe and a white stripe. In general, it can be seen from FIG. 9 that the offset between photodiode A and photodiode A' can be any odd multiple of D.

The output from each pair of photodiodes is processed by a corresponding channel circuit 154 that generates the channel signals. Each channel circuit generates a logic signal that switches between two states in a manner analogous to that discussed above with reference to FIGS. 4 and 5.

As noted above, the resolution of an encoder according to the present invention is D/n, where n is the number of photodiodes in the detection array, and D is the width of one stripe in the code strip image. Hence, by increasing n, substantial increases in resolution relative to prior art systems can be obtained. In the above-described embodiments, the photodiodes are organized as a single row of photodiodes. As n is increased, the length of the diode array increases. Refer now to FIG. 10, which illustrates an embodiment of the present invention having 6 photodiodes 211–216. To simplify the drawing, only the code strip image 101 and the photodiode array 202 are shown. However, it is to be understood that the outputs of the photodiodes are processed by channel circuits analogous to those described above, and the encoder includes an illumination and optical system which generates the code strip image from a suitable code strip. It is also to be understood that encoder 200 can include a second array of photodiodes that generates the complementary signals to those provided by the photodiodes in array 202 in a manner analogous to that described above with reference to FIG. 9.

Encoder 200 provides a resolution of D/6. That is, the n-bit binary number having the outputs of the channel circuits corresponding to photodiodes A–F will cyclically pass through 12 states when the code strip image moves a distance of 2D relative to diode array 202. In this embodiment, the photodiode array has a length equal to 5D. The photodiode array utilized in the present invention is preferably constructed as a single integrated circuit using conventional semiconductor fabrication techniques. In such fabrication systems, long, thin circuits are less cost effective than more compact circuits. In addition, it would be advantageous to be able to construct a higher resolution encoder from a plurality of photodiode arrays used in a lower resolution encoder.

Refer now to FIG. 11, which illustrates a 6 photodiode encoder 240 constructed from two sub-arrays of photodiodes. Encoder 240 can be viewed as being created from encoder 200 by dividing photodiode array 202 into two sub-arrays shown at 241 and 242. The width of the photodiodes in sub-arrays 241 and 242 is the same as the width of the photodiodes in array 202.

The two sub-arrays are offset with respect to one another by an amount Q in the example shown in FIG. 11. Q is determined such that the leading edge 243 of sub-array 241 will be in the same relationship to boundary 218 as the leading edge 244 of photodiode 214 was to boundary 217 shown in FIG. 10. If the diode array is split in half to create the sub-arrays, it can be shown that Q=D/2. In addition, it should be noted that offsets of Q=D/2+2mD, where m is an integer, will also provide a functional offset.

It should be noted that the code strip image must be sufficiently wide to cover both sub-arrays of photodiodes. Since the code strip that generates the image is typically fabricated by photolithography, this does not present any major difficulty.

As noted above, it would be advantageous to be able to construct encoder 240 using photodiode arrays that were designed for a lower resolution encoder. For example, it would be advantageous to use a 3-photodiode encoder array for each of the sub-arrays shown in FIG. 11. Such a substitution can be made if the width of the stripes in the code strip image is altered. In a photodiode array designed for a 3-photodiode encoder, d/D=2/3. However, in a photodiode array designed for a 6 diode encoder, d/D=5/6. Hence, the width of the stripes in the code strip image relative to the width of the photodiodes must be adjusted.

The required adjustment can be provided by altering the code strip dimensions or altering the imaging system that generates the code strip image from the code strip. It should be noted that an increase in the magnification of the image projection system in an imaging encoder can provide the required change. The required change in magnification in the image projection system has the effect of creating an image that is also wider than the image used for the 3-photodiode encoder. Hence, the change in magnification provides both the increase in width in the code strip image and the change in the ratio of d/D.

Various modifications to the present invention will become apparent to those skilled in the art from the foregoing description and accompanying drawings. Accordingly, the present invention is to be limited solely by the scope of the following claims.

What is claimed is:

1. An encoder comprising:
   a first array of n photodetectors, where n>2, each photodetector being characterized by a width d; and
   a code strip imaging system for generating an image from a code strip on said first array, said image comprising alternating dark and light stripes, said stripes having a width of D, said dark stripes having a lower luminosity than said light stripes, wherein nd=(n−1)D, said code strip image moving in a first direction with respect to said first array, said distances d and D being measured in a direction parallel to said first direction,
   wherein said first array of photodetectors is divided into a second array of photodetectors and a third array of photodetectors, each photodetector in said second array and said third array having a width d, wherein said third array of photodetectors is offset from said second array of photodetectors in said first direction, and
   wherein said third array of photodetectors is offset from said second array of photodetectors in a direction orthogonal to said first direction.

2. An encoder comprising:
   a first array of n photodetectors, where n>2, each photodetector being characterized by a width d; and
   a code strip imaging system for generating an image from a code strip on said first array, said image comprising alternating dark and light stripes, said stripes having a width of D, said dark stripes having a lower luminosity than said light stripes, wherein nd=(n−1)D, said code strip image moving in a first direction with respect to said first array, said distances d and D being measured in a direction parallel to said first direction;
   a plurality of detector circuits, each detector circuit converting a light intensity signal from a corresponding one of said photodetectors to a channel signal that switches between first and second logic states when said code strip moves relative to said array; and a complementary array of n photodetectors, each photodetector in said complementary array being characterized by a width d, said complementary array of photodetectors being positioned relative to said first array of photodetectors such that each photodetector in said complementary array of photodetectors generates a light intensity signal that is a complement of said light intensity signal generated by a corresponding one of said photodetectors in said first array.

3. An encoder comprising:

a first array of n photodetectors, where n>2, each photodetector being characterized by a width d; and a code strip imaging system for generating an image from a code strip on said first array, said image comprising alternating dark and light stripes, said stripes having a width of D, said dark stripes having a lower luminosity than said light stripes, wherein nd=(n−1)D, said code strip image moving in a first direction with respect to said first array, said distances d and D being measured in a direction parallel to said first direction, wherein said first array of photodetectors is divided into a second array of photodetectors and a third array of photodetectors, each photodetector in said second array and said third array having a width d, wherein said third array of photodetectors is offset from said second array of photodetectors in said first direction by a distance equal to D/2+2mD, where m is an integer greater than or equal to 0.

4. The encoder of claim 1 further comprising a plurality of detector circuits, each detector circuit converting a light intensity signal from a corresponding one of said photodetectors to a channel signal that switches between first and second logic states when said code strip moves relative to said array.

5. The encoder of claim 4 wherein said channel signals define a state for said encoder that repetitively cycles through 2n values when said code strip image moves a distance of 2D relative to said first array in said first direction.

* * * * *

UNITED STATES PATENT AND TRADEMARK OFFICE
CERTIFICATE OF CORRECTION

PATENT NO.       : 7,026,604 B2  
APPLICATION NO.  : 10/616633  
DATED            : April 11, 2006  
INVENTOR(S)      : Chong Keong Page 1 of 1

It is certified that error appears in the above-identified patent and that said Letters Patent is hereby corrected as shown below:

Col. 8 Line 9 In Claim 4, delete "claim 1" and insert -- claim 3 --, therefor.

Signed and Sealed this

Seventeenth Day of February, 2009

JOHN DOLL  
*Acting Director of the United States Patent and Trademark Office*